United States Patent [19]

Easton et al.

[11] Patent Number: 5,244,496

[45] Date of Patent: Sep. 14, 1993

US005244496A

[54] RUB-RESISTANT, WATER-FAST INK FOR INK JET PRINTERS

[75] Inventors: J. Douglas Easton, Cincinnati; Twyla J. Respress, Dayton, both of Ohio

[73] Assignee: Eastman Kodak Company, Rochester, N.Y.

[21] Appl. No.: 789,388

[22] Filed: Nov. 6, 1991

Related U.S. Application Data

[63] Continuation of Ser. No. 287,528, Dec. 19, 1988, abandoned, which is a continuation of Ser. No. 47,393, May 8, 1987, abandoned.

[51] Int. Cl.$^5$ .................. C09D 11/00; C09D 11/02
[52] U.S. Cl. .................. 106/22 H; 106/20 D; 260/DIG. 38; 523/160; 524/190
[58] Field of Search .................. 106/22, 20; 260/DIG. 38; 523/160; 524/190

[56] References Cited

U.S. PATENT DOCUMENTS

| 4,104,219 | 8/1978 | Peters et al. | 106/20 |
| 4,269,627 | 5/1981 | Hwang | 106/22 |
| 4,334,878 | 6/1982 | Cutler et al. | 524/88 |
| 4,471,079 | 9/1984 | Enami | 523/161 |

FOREIGN PATENT DOCUMENTS

| 130789 | 6/1984 | European Pat. Off. . |
| 55-65270 | 11/1978 | Japan . |
| 55-66976 | 11/1978 | Japan . |
| 55-155068 | 5/1979 | Japan . |
| 59-95188 | 11/1982 | Japan . |

OTHER PUBLICATIONS

Derwent Abstract Accession No. 84–173712/28, Japanese patent no. 59095188, Jun. 1, 1984.
Derwent Abstract Accession No. 81–08803D/06, Japanese patent no. 55155068, Dec. 3, 1980.
Derwent Abstract Accession No. 80–47096c/27, Japanese patent no. 55066976, May 20, 1980.
Derwent Abstract Accession No. 80–45784c/26, Japanese patent no. 55065270, May 16, 1980.

*Primary Examiner*—Amelia Burgess Yarbrough
*Attorney, Agent, or Firm*—Dana M. Schmidt

[57] ABSTRACT

An ink is described, comprising an amine having a boiling point of between about 120° C. and about 200° C., an acrylic binder selected to render the ink filterable, a direct dye or acid dye substituted with at least 3 amino groups, and water.

8 Claims, No Drawings

RUB-RESISTANT, WATER-FAST INK FOR INK JET PRINTERS

This is a continuation of U.S. patent application Ser. No. 287,528, filed Dec. 19, 1988, abandoned, which is a continuation of U.S. patent application Ser. No. 047,393, filed May 8, 1987, now abandoned.

FIELD OF THE INVENTION

This invention relates to printing inks, and more particularly to such inks as are used in ink jet printers.

BACKGROUND OF THE INVENTION

Rub-resistance is that property of an ink-jet ink that allows the ink to be printed onto a substrate, and after aging, show no signs of smudging or an ink transfer when the printed substrate is rubbed. Water fastness is that property that allows water to be spilled on the printed page without smearing or otherwise destroying the image. These properties are not easy to obtain, and are particularly difficult for substrates such as waxy substrates, transparent plastic substrates, e.g., acetate substrates, and pre-screen print substrates wherein a color has already been printed as an overall background.

As with any property in ink-jet inks, rub resistance and water fastness are not readily obtained by the simple addition of one more chemical to the ink formulation. The reason is that there are a number of other properties that tend to be altered, when another chemical is added. One of the most important of these other properties is filterability. That is, one of the last steps in ink manufacture is filtration of the ink through one or more filters down to a pore size of 1.2 $\mu$. The purpose is to eliminate extraneous matter usually introduced via the dye stuff. Failure to filter the finished ink to remove such matter usually leads to plugging of the printer orifices.

However, the very materials that can result in improved water fastness and rub resistance also tend to cause blockage of the filter. If the ink blocks the filter, it of course cannot be adequately filtered without continued replacement of the filters. Such replacements are extremely expensive.

It has been found that the following filterability test is a reliable measure of an ink's ability to pass through such filters:

The ink composition without the binder is first filtered down to 1.2 microns. (This is to remove the matter contributed by the dye stuff, so that the filterability of the binder can be ascertained without the dye stuff in fact being the cause of filter blockage. This first filtration step is omitted, of course, in actual manufacturing of the ink.)

Thereafter, the acrylic binder is added in an amount that insures that 1.37 weight % of the ink comprises the binder as nonvolatile solids. About one liter of this total ink is then filtered under vacuum of about 18 cm of Hg through, a) a glass fiber depth filter having nominal pore sizes of 1 micron; then b), a membrane filter having a pore size of 3.0 microns; and then c), a membrane filter having a pore size of 1.2 microns. All filters a)-c) are 47 mm in diameter. If no substantial blockage occurs in the filteration through any of the three filters a)-c), the ink has passed the test. As used herein, "no substantial blockage" means, the ink is able to flow through each of the filters without being reduced to a dripping flow. That is, all the ink comes through as a continuous stream.

U.S. Pat. No. 4,334,878 describes an ink-jet ink that purports to provide "smear resistance." Key components of this ink are ammonia and an acrylic binder which is a copolymer of acrylic acid and styrene. A specific preferred example is Joncryl 67 obtained from S.C. Johnson Co. However, this binder is base soluble, and has been found to in fact, provide insufficient rub-resistance.

Thus, what has been needed prior to this invention is an ink for ink-jet printers that provides rub resistance and water fastness, without sacrificing other essential properties such as filterability.

SUMMARY OF THE INVENTION

We have discovered that there are amine-acrylic binder combinations that can provide the necessary rub resistance and water fastness for ink-jet printers, without adversely affecting the ink's filterability.

More specifically, in accord with one aspect of the invention there is provided a rub-resistant, aqueous ink-jet ink composition, comprising an amine having a boiling point of between about 120° C. and about 200° C; an acrylic emulsion resin binder free of amine groups, which binder, when non-reactively added to the amine, provides a filterability to the ink such that, when the in composition is filtered as noted above, no substantial blockage of the filter occurs during any one of the filtrations a)-c); a direct dye or acid dye substituted with at least three amino groups; and water.

In accord with another aspect of the invention, there is provided a rub-resistant, aqueous ink jet ink composition; comprising an amine having a boiling point of between about 120° and about 200° C.; and an aqueous base—dispersible and —insoluble acrylic binder which, when added to the amine, provides a filterability to the ink such that, when the ink composition is filtered through the filters noted above, no substantial blockage of the filter occurs during any one of the aforesaid three filtrations;

a direct dye or acid dye substituted with at least 3 amino groups; and water.

Thus, it is an advantageous feature of the invention that a rub-resistant and water-fat ink is provided that is useful on waxy substrates, transparent plastic substrates, and/or pre-screen print substrates.

It is a related advantageous feature of the invention that such an ink is provided which has excellent filterability such that the ink can be filtered during manufacturing without ruining the filters.

Other advantageous features will become apparent upon reference to the following detailed discussion of the preferred embodiments.

DETAILED DISCUSSION OF THE PREFERRED EMBODIMENTS

The invention is described as an ink primarily for use in a continuous jet ink-jet printer. In addition, the ink of the invention is also useful in other types of ink-jet printers.

Aqueous ink jet inks conventionally include a dye and water buffered to a pH suitable to prevent corrosion of the print head. Such buffering preferably keeps the pH at about 9.0 for anti-corrosion. In accord with this invention, however, only certain amines are effective for this purpose. That is, an amine must be used having a boiling point of between about 120° C. and about 200° C. The reason is that, it has been found that this amine cooperates with the binder to insure that the ink will form on the substrate an insoluble, non-redispersible polymer for water fastness. If the amine's boiling point is below 120° C., it tends to be too volatile, and will cause premature coalescence and clog the print head. Thus, ammonia is an unsatisfactory base. If it is above 200° C., it will take too long to evaporate and water fastness will not develop soon enough.

The preferred amines for this invention are alkyl— and alkanol— substituted amines. Highly preferred examples of useful amines include dimethylethanolamine, diethylethanolamine, dimethylaminomethylpropanol, 3-amino-1-propanol, 2-amino-2-methyl-1-propanol, and the like. In accord with another aspect of the invention, there is added to the ink an acrylic binder free of amine groups which, together with the amine, provides a sufficient rub resistance and water fastness. At the same time, the binder is selected to satisfy the filterability test noted above. Preferably, the acrylic binder is aqueous base-dispersible but not aqueous-base soluble, wherein "base" refers to the amines and their concentrations as used herein. Thus, a highly preferred example of an acrylic binder that passes said test is "Joncryl 95" TM acrylic binder supplied by S.C. Johnson Co. This binder has the property of being a dispersion at room temperature in aqueous base, and is insoluble in ammonia. It is free of amine groups, and does not chemically react with the highly preferred amines noted above.

Other useful acrylic binders include, from the same supplier, "Joncryl 80" TM. As best we have been able to determine, this differs from Joncryl 95 in that its molecular weight is higher and its glass transition temperature is lower. It also is free of amine groups. In addition, it is noted that "Joncryl 80" TM is a styrenated acrylic polymer emulsion having a molecular weight (determined by weight average) of greater than 200,000, a Tg of −30° C., and a minimum film forming temperature of less than 70° C. "Joncryl 95" TM is a styrenated acrylic polymer emulsion having a molecular weight of less than 50,000, a Tg of 43° C., and a minimum film forming temperature of 20° C.

Not all direct or acid dyes will work with the acrylic binder of this invention to provide the desired rub resistance. Rather, the direct dyes and acid dyes that are considered to be useful are substituted with at least three amino groups. Included in this class are the following dyes: From the list in U.S. Pat. No. 4,395,288, which is expressly incorporated herein by reference, dyes numbered 4–6, 21–22, 44–47, 52–53 and 80–81. Also included are dyes numbered 141, 142, 143, and 147 from the list in U.S. Pat. No. 4,426,226, also expressly incorporated herein by reference. Highly preferred are those dyes that have the following structural formula I:

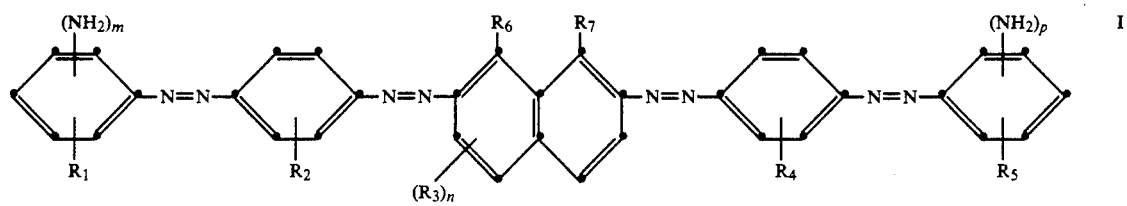

wherein:
$R_1$–$R_5$ are individually H or —$SO_3Na$, provided that at least two of them are —$SO_3Na$,
$R_6$ and $R_7$ are individually —$NH_2$ or —OH, provided one of them is —OH,
and m, n and p are individually 1 or 2, provided that m plus p equals at least 3.

Most preferred examples of such dyes are Direct Black dyes such as Direct Black 19, having the formula

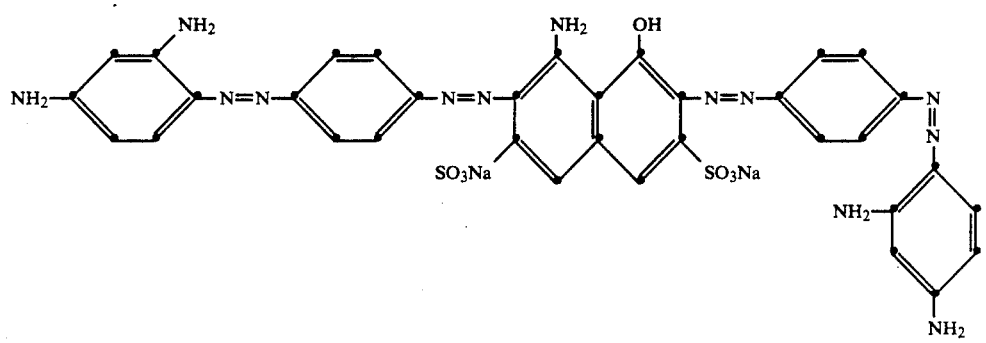

and a dye such as that noted as No. 81 in U.S. Pat. No. 4,395,288, having the formula:

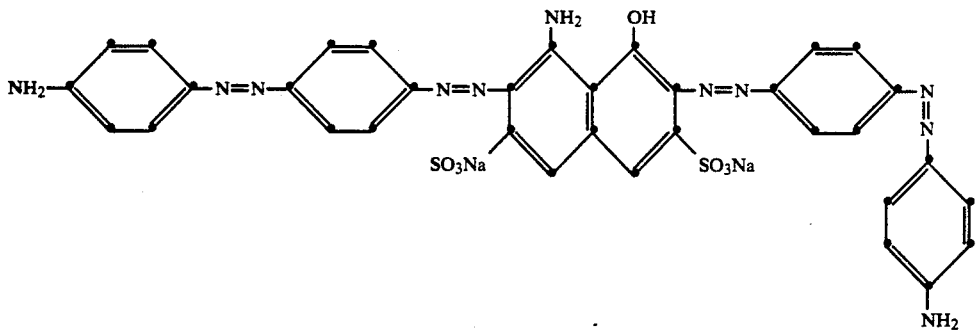

It is believed that at least three amine groups are needed to retain the dye with the polymer for water fastness.

Other addends that are optionally included in the ink of the invention include:

a biocide from 0 to 0.5 wt %, such as dehydroacetic acid, a corrosion inhibitor in an amount of from 0 to 0.2 wt %, such as an alkanolamine, and a wetting agent of from 0 to 1 wt %, such as an ethoxylated glycol ether. Most preferably, to avoid any tendency of the ink to foam, the ink also includes an optional defoamer, such as a phosphate ester, silicone or non-silicone defoamer, or acetylenic diol.

The following is a preferred example of an ink prepared in accordance with the invention, the solvent being de-ionized water:

| Component | Wt % |
| --- | --- |
| Direct Black 19 dye | 2 |
| Joncryl 95 binder | 5 |
| Dimethylethanolamine | 1 |
| Sodium dioctyl sulfosuccinate wetting agent | 0.16 |
| 1,2-Benzisothiazoline-3-one biocide | 0.1 |
| Corrosion inhibitor | minute quality |
| Defoamer | minute quality |

Most preferably, the ink of this invention is essentially free of glycols, for the reason that the glycols are an added expense and tend to prolong the drying time of the ink on the paper.

EXAMPLES

The above-recited most preferred composition was used in a "2700" TM ink jet printer obtained from Diconix, and rub-resistant prints, using the rub-resistant test defined hereinafter, were satisfactorily produced on the following substrates: paper coated with wax, acetate, aluminum foil, polyolefins and pre-screen prints.

To demonstrate the filterability of the ink composition of the invention, the following dye base was prepared: dimethylethanolamine (9.3 parts) and Direct Black 19 (18.6 parts) were dissolved in deionized water (901.8 parts) and filtered down to 1.2 microns. (This was done to be certain the filtering test would measure the filterability of the binder, and not that of the dye base which is known to have particulate matter removed by filtration.) This dye base was converted to ink by the addition of the acrylic resin binder being tested. The amount of resin added was selected to give equal quantities of nonvolatile binder.

The following inks were prepared to contain 1.37% nonvolatile binder:

|  | Example 1 | Example 2 | Comparative Example 1 |
| --- | --- | --- | --- |
| Dye Base | 930 g | 930 g | 930 g |
| Joncryl 537 (45.5% nv) | — | — | 29.4 g |
| Joncryl 95 (27% nv) | 49.6 g | — | — |
| Joncryl 80 (49% nv) | — | 27.3 g | — |
| Deionized Water | — | 22.3 g | 20.2 g |
| Total | 979.6 g | 979.6 g | 979.6 g |

Three filters were then obtained. Filter No. 1 was a 47-mm diameter glass fiber depth filter obtained under the tradename "Extra Thick Glass Fiber Filter" from Gelman Sciences Inc., Ann Arbor, Michigan, with nominal pore sizes of 1 micron. Filter No. 2 was a 47 mm diameter membrane filter with a pore size of 3 microns, obtained from the same source under the tradename "Versapore 3000". Filter No. 3 was a 47 mm diameter membrane filter with a pore size of 1.2 microns, obtained from the same source under the tradename "Versapore 1200".

The total quantity (about one liter) of each of the Examples 1, 2, and Comparative Example 1 were filtered under vacuum of about 18 mm of Hg through, first, a clean filter No. 1, then a clean filter No. 2, and lastly a clean filter No. 3. The filtration rates were examined to ascertain that no substantial blockage, as defined above, occurred.

The results were as follows: For Examples 1 and 2, no substantial blockage occurred in any of the three filtration steps. In fact, the filtration proceeded so well with respect to Example 1, that it was found that the first two coarser filters Nos. 1 and 2 could be omitted entirely, so that when Example 1 is applied directly to Filter No. 3, it filters through without any substantial blockage.

However, with respect to the Comparative Example 1, now only did substantial blockage occur during filtration at Filters No. 1 and 3, but also such blockage continued even when the filter material for Nos. 1 and 3 was replaced with fresh filter material. That is, it took three successive fresh Filters No. 1 to get all of the ink to filter through, and four successive fresh Filters No. 3 to get all of the ink to filter through. Translated into actual manufacturing practice, this means that repeated replacement of the filter material would be necessitated by the use of the binder selected for Comparative Example 1, an intolerable expense.

For the above reasons, "Joncryl 537" has been determined to be unsatisfactory as an acrylic resin binder for the ink composition of this invention. Although the exact reasons are not certain, and are unnecessary to the practice of the invention, it is through that the particle size of the resin in its emulsified form may contribute to filterability or the lack thereof.

COMPARATIVE EXAMPLE 2

Not all acrylic resin binders are satisfactory in the ink composition, even if they are filterable as per the above-described filterability test. That is, they must also provide adequate rub resistance. This resistance is determined by the following test:

An ink containing an amount of acrylic binder equivalent to or in excess of the non-volatile solids weight known to be acceptable with a useful binder, is printed onto a 60 pound glossy-coated and color printed paper stock (of the type used in four-color printing) using a "Model 150" Thermal Drop-On-Demand Print System manufactured by Diconix, Dayton, Ohio. The prints are exposed at 70 degrees C. for 5 min, and then aged at room temperature, some for 48 hours, some for 96, and the remainder for 192 hours. After the aging the print samples are each rubbed using a Sutherland Rub Tester, for example one manufactured by James River Corp., Kalamazo, Mich., which is a rub tester commonly used in the industry. In this procedure, the print is rubbed once by a 908 gm block after applying 3 drops of water, to ascertain whether and how much ink is lost or rubbed from the image areas into the non-image areas.

To prepare an ink in which "Joncryl 67" is the acrylic binder, the base ink of Ex. 1 was selected. Enough of the solid acrylic resin was added to provide a nonvolatile weight % of 2.7, which is twice the normal amount. (Extra binder was added as a conservative test, because if the ink fails the rub test with extra binder, it will surely fail at the normal concentrations.)

The rub test, when applied to the acrylic resin binder "Joncryl 67", was found to produce considerable smudging into non-image areas. Thus, the acrylic resin "Joncryl 67" is unsatisfactory, even though it clearly produces an ink that passes the aforedescribed filterability test. It is believed that the base-solubility of this resin produces its lack of rub resistance.

In contrast, when the rub resistance test was applied to the ink comprising Examples 1 or 2 with a binder of 1.35 nonvolatile weight %, the printed samples were found to produce very little ink loss or smudging. This demonstrated the superiority of the base-insoluble acrylic resin, compared to the base-soluble form exemplified by "Joncryl 67".

COMPARATIVE EXAMPLE 3

The ink of the most preferred composition was used, except that the dye used was Food Black 2 as identified in U.S. Pat. No. 4,197,135, instead of Direct Black 19. (Food Black 2 has the formula:

This ink so constituted failed to provide rub resistance as defined above when printed onto the substrate noted above.

The invention has been described in detail with particular reference to preferred embodiments thereof, but it will be understood that variations and modifications can be effected within the spirit and scope of the invention.

What is claimed is:

1. A rub-resistant, aqueous ink jet ink composition; consisting essentially of
    an amine selected from the group consisting of dimethyethanolamine, diethylethanolamine, dimethylaminoethylpropanol, 3-amino-1-propanol, and 2-amino-2-methyl-1-propanol,
    an acrylic emulsion resin binder free of amines, which binder, when non-reactively added to said amine, provides
    (1) a filterability to the ink such that when said ink composition is filtered first without the binder through a 1.2 micron filter, and then with the binder under a vacuum of about 18 cm of Hg, through, (a a glass fiber depth filter having a nominal pore size of 1 micron; then b), a membrane filter having a pore size of 3.0 microns; and then c), a membrane filter having a pore size of 1.2 microns, each of said filters of steps a)-c) being 47 mm in diameter, no substantial blockage of the filter occurs during any one of the three filtrations a)-c); and
    2) rub-resistance such that after the ink is printed and aged for at least 48 hours, and rubbed once by a 908 cm block after applying 3 drops of water, there is substantially no ink loss or smudging;
    a direct dye or acid dye substituted with at least 3 amino groups,
    water,
    and optionally any one or more of the following addenda; a biocide, a corrosion inhibitor, a wetting agent, and a defoamer.

2. A rub-resistant, aqueous ink jet ink composition; consisting essentially of
    an amine selected from the group consisting of dimethyethanolamine, diethylethanolamine, dimethylaminoethylpropanol, 3-amino-1-propanol, and 2-amino-2-methyl-1-propanol,
    an aqueous base—dispersible and —insoluble acrylic binder free of amines, which binder, when non-reactively added to said amine, provides
    1) a filterability to the ink such that when said ink composition is filtered first without the binder through a 1.2 micron filter, and then with the binder under a vacuum of about 18 cm of Hg, through, a) a glass fiber depth filter having a nominal pore size of 1 micron; then b), a membrane filter

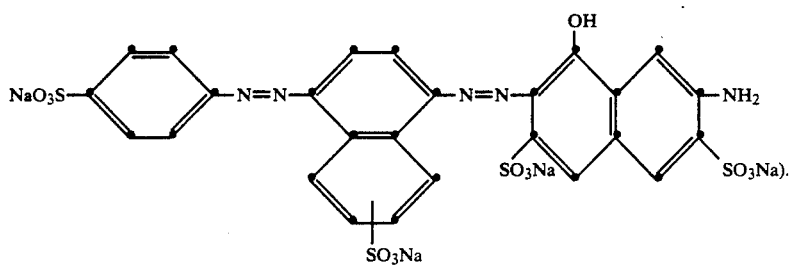

having a pore size of 3.0 microns; and then c), a membrane filter having a pore size of 1.2 microns, each of said filters of steps a)–c) being 47 mm in diameter, no substantial blockage of the filter occurs during any one of the three filtrations a)–c); and 2) rub-resistance such that after the ink is printed and aged for at least 48 hours, and rubbed once by a 908 gm block after applying 3 drops of water, there is substantially no ink loss or smudging;

a direct dye or acid dye substituted with at least 3 amino groups, water, and optionally any one or more of the following addenda; a biocide, a corrosion inhibitor, a wetting agent, and a defoamer.

3. An ink as defined in claim 1 or 2, wherein said dye has the structural formula:

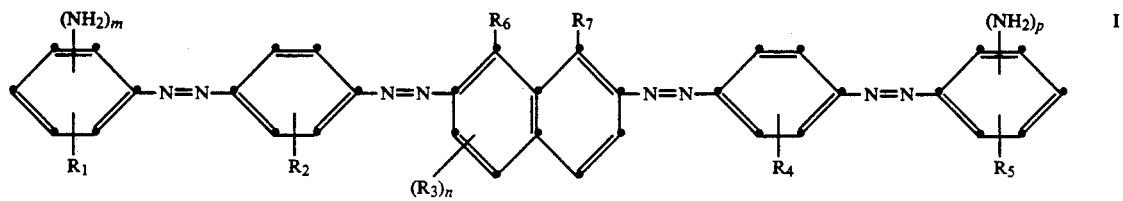

wherein:
$R_1$–$R_5$ are individually H or —$SO_3Na$, provided that at least two of them are —$SO_3Na$,
$R_6$ and $R_7$ are individually —$NH_2$ or —OH, provided at least one is —OH,
and m, n and p are individually 1 or 2, provided that m plus p must equal at least 3;
and water.

4. An ink as defined in claim 3, wherein said dye is a Direct Black dye.

5. An ink as defined in claim 4, wherein said dye is Direct Black 19.

6. An ink as defined in claim 1 or 2 wherein said ink is essentially free of a glycol.

7. A rub-resistant, aqueous ink jet ink composition; consisting essentially of
an amine selected from the group consisting of dimethyethanolamine, diethylethanolamine, dimethylaminomethylpropanol, 3-amino-1-propanol, and 2-amino-2-methyl-1-propanol,
an emulsion resin binder comprising a styrenated acrylic binder selected from the group consisting of a polymer emulsion having a weight-average molecular weight of greater than 200,000, a Tg of −30° C., and minimum film-forming temperature of less than 70° C.; and a polymer emulsion having a weight-average molecular weight of less than 50,000, a Tg of 43° C., and a minimum film-forming temperature of 20° C.; which binder, when added to said amine, provides 1) a filterability to the ink such that, when said ink composition is filtered first without the binder through a 1.2 micron filter, and then with the binder under a vacuum of about 18 cm of Hg, through, a) a glass fiber depth filter having a nominal pore size of 1 micron; then b), a membrane filter having a pore size of 3.0 microns; and then c), a membrane filter having a pore size of 1.2 microns, each of said filters of steps a)–c) being 47 mm in diameter, no substantial blockage of the filter occurs during any one of the three filtrations a)–c);

and 2) rub-resistance such that after the ink is printed and aged for at least 48 hours, and rubbed once by a 908 cm block after applying 3 drops of water, there is substantially no ink loss or smudging;

a direct dye or acid dye substituted with at least 3 amino groups, water, and optionally any one or more of the following addenda; a biocide, a corrosion inhibitor, a wetting agent, and a defoamer.

8. An ink as defined in claim 7, wherein said dye has the structural formula:

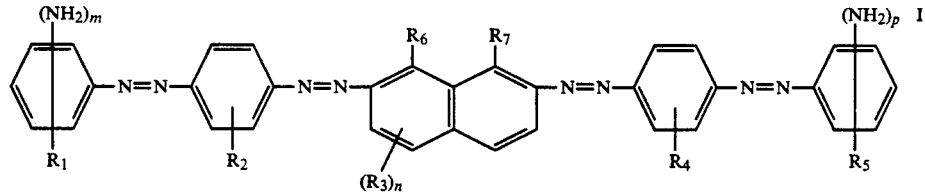

wherein:
$R_1$–$R_5$ are individually H or —$SO_3Na$, provided that at least two of them are —$SO_3Na$,
$R_6$ and $R_7$ are individually —$NH_2$ or —OH, provided at least one is —OH,
and m, n and p are individually 1 or 2, provided that m plus p must equal at least 3;
and water.

* * * * *